United States Patent
Hollberg

(10) Patent No.: US 9,095,037 B2
(45) Date of Patent: Jul. 28, 2015

(54) NOZZLE FOR A LIQUID-COOLED PLASMA CUTTING TORCH WITH GROOVES

(75) Inventor: Manfred Hollberg, Goldach (CH)

(73) Assignee: Holma AG, Goldach (CH)

( * ) Notice: Subject to any disclaimer, the term of this patent is extended or adjusted under 35 U.S.C. 154(b) by 293 days.

(21) Appl. No.: 13/576,481

(22) PCT Filed: Feb. 1, 2011

(86) PCT No.: PCT/EP2011/000433
§ 371 (c)(1),
(2), (4) Date: Oct. 22, 2012

(87) PCT Pub. No.: WO2011/095315
PCT Pub. Date: Aug. 11, 2011

(65) Prior Publication Data
US 2013/0075372 A1    Mar. 28, 2013

(30) Foreign Application Priority Data
Feb. 4, 2010   (DE) .......................... 10 2010 006 786

(51) Int. Cl.
| | |
|---|---|
| *B23K 10/00* | (2006.01) |
| *H05H 1/28* | (2006.01) |
| *F23D 14/54* | (2006.01) |
| *H05H 1/34* | (2006.01) |

(52) U.S. Cl.
CPC .................. *H05H 1/28* (2013.01); *B23K 10/00* (2013.01); *F23D 14/54* (2013.01); *H05H 1/34* (2013.01); *H05H 2001/3478* (2013.01)

(58) Field of Classification Search
CPC ... H05H 1/28; H05H 1/34; H05H 2001/3478; F23D 14/54
USPC ........................ 219/121.49, 121.5, 121.51, 75; 313/231.41
See application file for complete search history.

(56) References Cited

U.S. PATENT DOCUMENTS

| | | | |
|---|---|---|---|
| 2,092,150 A | 9/1937 | Bleakley | |
| 3,459,376 A | * 8/1969 | Haase et al. ............... | 239/132.3 |
| 3,463,957 A | 8/1969 | Fuksiewicz | |
| 4,656,330 A | 4/1987 | Poole | |
| 5,023,425 A | 6/1991 | Severance, Jr. | |
| 5,097,111 A | 3/1992 | Severance, Jr. | |

(Continued)

FOREIGN PATENT DOCUMENTS

| | | |
|---|---|---|
| DE | 1 565 638 | 4/1970 |
| DE | 25 57 482 | 2/1977 |

(Continued)

OTHER PUBLICATIONS

International Search Report dated May 13, 2011 in International Application No. PCT/EP2011/000433.

*Primary Examiner* — Mark Paschall
(74) *Attorney, Agent, or Firm* — Faegre Baker Daniels LLP

(57) ABSTRACT

This application relates to a nozzle (3) for a liquid-cooled plasma cutting torch, having at least one groove (6a) which is arranged on an outer wall (4) of the nozzle (3) with which the liquid makes contact, is oriented with the direction of its longitudinal axis (18) approximately perpendicular to the nozzle mid-axis (17) of the nozzle (3) and reduces the wall thickness (15) of the nozzle (3), at least in this region, and has a groove base (12, 13) that reaches into the wall thickness (15), wherein the groove base (12, 13) of the groove (6a) is formed so as to be approximately parallel to the contour of the inner wall (5) of the nozzle (3).

20 Claims, 6 Drawing Sheets

(56) References Cited

U.S. PATENT DOCUMENTS

Figure 1A:
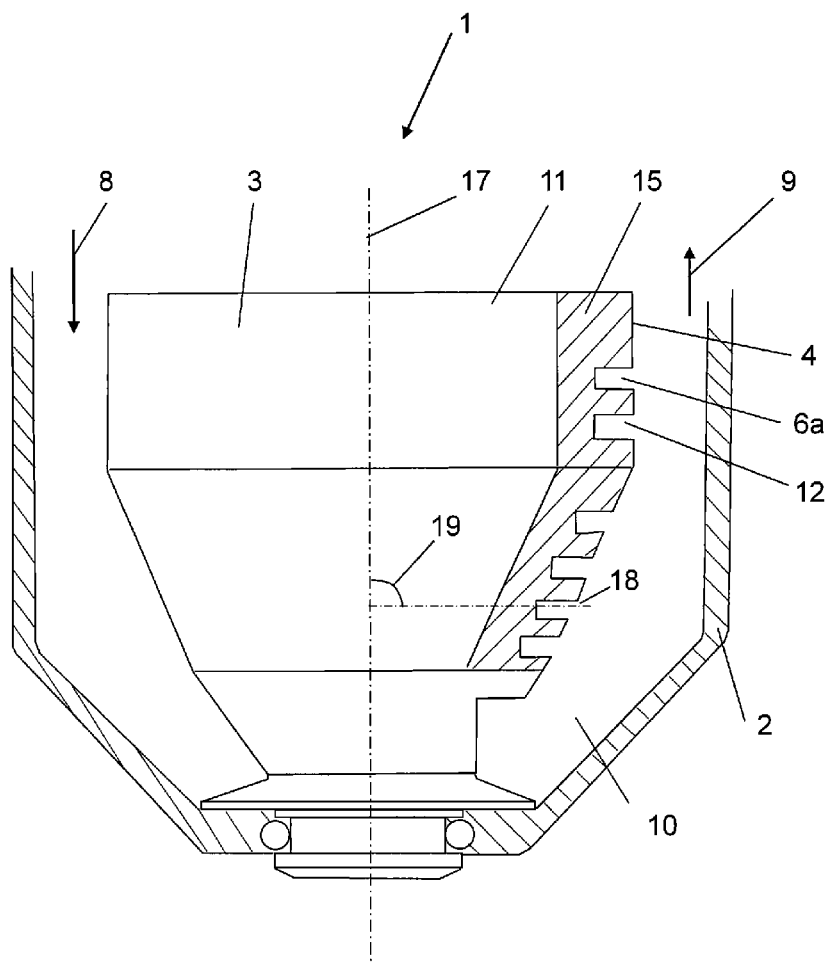

| | | | |
|---|---|---|---|
| 5,362,938 A * | 11/1994 | McGee et al. | 219/121.51 |
| 5,396,043 A * | 3/1995 | Couch et al. | 219/121.5 |
| 5,416,296 A | 5/1995 | Walters | |
| 5,569,397 A * | 10/1996 | Tsurumaki et al. | 219/121.51 |
| 5,676,864 A | 10/1997 | Walters | |
| 5,844,196 A | 12/1998 | Oakley | |
| 6,114,650 A | 9/2000 | Marner et al. | |
| 6,362,450 B1 | 3/2002 | Severance, Jr. | |
| 6,433,300 B1 | 8/2002 | McBennett | |
| 6,452,130 B1 | 9/2002 | Qian et al. | |
| 6,483,070 B1 | 11/2002 | Diehl et al. | |
| 6,563,075 B1 | 5/2003 | Severance et al. | |
| 7,132,619 B2 | 11/2006 | Conway et al. | |
| 8,575,510 B2 * | 11/2013 | Laurisch et al. | 219/121.5 |
| 2004/0200810 A1 | 10/2004 | Brandt et al. | |
| 2008/0093346 A1 | 4/2008 | Yamaguchi et al. | |
| 2008/0116179 A1 | 5/2008 | Cook et al. | |
| 2010/0155373 A1 | 6/2010 | Yamaguchi et al. | |
| 2011/0108528 A1 | 5/2011 | Laurisch et al. | |
| 2012/0138584 A1 | 6/2012 | Ashtekar et al. | |
| 2013/0240499 A1 | 9/2013 | Hollberg | |

FOREIGN PATENT DOCUMENTS

| | | |
|---|---|---|
| DE | 10 2008 018 530 | 10/2009 |
| DE | 10 2009 059 108 | 6/2011 |
| EP | 1 933 607 | 6/2008 |
| JP | 5-23859 | 2/1993 |
| WO | 92/00658 | 1/1992 |
| WO | 2009/008271 | 1/2009 |
| WO | 2009/070362 | 6/2009 |
| WO | 2012/074591 | 6/2012 |

* cited by examiner

NOZZLE FOR A LIQUID-COOLED PLASMA CUTTING TORCH WITH GROOVES

CROSS-REFERENCE TO RELATED APPLICATION

This application is related to and claims the benefit under 35 U.S.C. §119 and 35 U.S.C. §365 of International Application No. PCT/EP2011/000433, filed Feb. 1, 2011, the disclosure of which is expressly incorporated herein by reference.

1. FIELD OF THE INVENTION

The subject matter of the invention is a nozzle for a liquid-cooled plasma cutting torch with improved cooling.

2. PRIOR ART

Plasma cutting is a thermal cutting procedure, in which the material is melted by the plasma jet, and is blown out of the kerf.

Plasma arc cutting is particularly suited for cutting alloyed steels and nonferrous metals. With these materials, the melting temperatures of the resulting oxides are higher than that of the metal itself. For this reason, autogenic torch cutting is not possible.

With plasma cutting torches a pilot light arc is ignited between the tungsten electrode and the torch nozzle. The gas flowing through the nozzle is ionized thereby, i.e. it becomes electroconductive (plasma gas). By activating the plasma flow, the arc between the electrode and the workpiece then burns. The thin plasma jet generated in this manner exits the cooled tapered nozzle with a high energy density.

The molten liquid material is then blown from the kerf by the high exit speed of the plasma gas resulting from the uniform advancement of the cutting torch. The cutting rates, depending on the thickness of the material, range between 1 m/min. to 8 m/min.

In order to minimize the resulting environmental impacts such as, e.g. smoke, dust, noise and UV radiation during plasma cutting, a water shielding is implemented during the cutting process.

This may be formed either through a water curtain surrounding the torch, or by cutting in a water bath.

Plasma cutting is distinguished by a good cutting quality and a high cutting speed at comparably low costs. As a result, it is already a permanent production fixture in many industrial fields.

Plasma cutting torches are subdivided into two categories:
Direct plasma generators: The arc is transferred directly to the substrate that is to be processed. The anode is located outside of the plasma generator.
Indirect plasma generators: The arc exists only in the plasma generator—the anode is a component of the plasma generator.

With the use of nitrogen, preferably a tungsten electrode is used. In contrast to this, when compressed air is used, an electrode having a zirconium or hafnium coating is used, as said coating results in a formation of a more stable arc spot.

The nozzle of the plasma cutter is exposed to a high thermal load, and for this reason it is preferably made of a metallic material having a high degree of thermal conductivity and electric conductivity as well. In order to obtain greater durability with regard to the nozzle, said nozzle is cooled with a liquid, such as water, for example. The cooling agent flows through the coolant space formed by the nozzle and the nozzle hood. In order to efficiently exploit the cooling effect of the liquid, according to the prior art, the nozzle has projections extending from the nozzle wall, which are supposed to cause a turbulence in the cooling fluid. This enables a better heat transfer from the nozzle wall to the cooling fluid.

DE 1 565 638 shows a nozzle configuration for a plasma torch. The torch head has a particularly slender shape and is preferably used for plasma cutting or for the preparation of welding edges. A coolant space is formed between the nozzle hood and the cutting nozzle, designed as a straight, uniform annular channel. The feeding and drainage of the cooling fluid is carried out in the upper region of the torch nozzle.

A nozzle for a liquid cooled plasma torch is described in DE 10 2008 018 530 A1. The nozzle features at least one cone-shaped projection on the exterior wall of the nozzle, expanding toward the tip of the nozzle, which forms a flow resistance, or a turbulence, respectively, in the cooling fluid. The projections extend, in all of the embodiment examples presented therein, away from the exterior wall of the nozzle, and are at a certain angle with respect to the tip of the nozzle.

A plasma torch is described in WO 92/00658 having a nozzle exterior wall with grooves directed inwards. The incisions are rectangular, and have a straight groove base. The groove base runs parallel to the central axis of the nozzle as a result. In the sloped section of the exterior wall of the nozzle, the straight groove base depicts either a cross-section reduction of the wall thickness, wherein the wall thickness in the upper region of the groove base is disadvantageously thin. Or the spacing between the interior wall and the straight groove base is so great that no effective heat transfer from the nozzle wall to the cooling fluid can take place.

All of the aforementioned embodiments have either a straight coolant space, or a coolant space having extending projections, respectively, or they have grooves directed inward having a straight groove base. Both embodiments present a disadvantage with respect to an efficient heat transfer from the nozzle wall to the cooling fluid.

3. SUBJECT MATTER OF THE INVENTION

The invention therefore assumes the objective of obtaining a nozzle for a liquid cooled plasma torch having an improved cooling effect.

To attain the assumed objective, the invention is characterized by the technical teachings of Claim 1.

The substantial characteristic of the invention is that the groove base of the groove is designed to be substantially parallel to the shape of the interior wall of the nozzle.

In a first embodiment, the nozzle has individual grooves, designed as inward oriented incisions in the exterior wall of the nozzle. The grooves have preferably a rectangular profile, whereby they have a sloped groove base. The sloped groove base is designed such that it runs parallel to the contour of the interior wall of the nozzle. This represents a substantial advantage over the prior art, because as a result, a more effective heat transfer from the interior wall to the cooling fluid flowing over the exterior wall can be achieved. In another design, the grooves can have a trapezoidal profile. In this case, the grooves become wider in the form of a wedge from the groove base outward.

Another advantage is the uniform wall thickness obtained in the region of the sloped groove base. By this means, not only is a certain minimum wall thickness provided, but at the same time, a good heat transfer is also ensured.

The number of grooves on the exterior wall of the nozzle should not be restricted to one—numerous grooves in both the straight region as well as in the sloped region of the nozzle may be present. A symmetrical configuration, however, of the annular grooves is preferred.

In a second embodiment the groove is designed as an annular groove, and has a sloped groove base running parallel to the contour of the interior wall. A more effective heat transfer over the entire exterior circumference of the nozzle takes place by means of the annular groove.

Another advantage is that the sloped groove base enables a minimal wall thickness. Moreover, as a result of the existing minimal wall thickness, an embodiment having numerous annular grooves on the exterior wall of the nozzle can be realized.

In another preferred embodiment the groove is designed as a longitudinal groove, and runs in the direction of the longitudinal central axis of the nozzle. By this means, it is possible to allow the cooling fluid to run along the nozzle. The longitudinal groove is preferably rectangular in shape, whereby the groove base is adapted to the contour of the interior wall. As a result, a good heat transfer is made possible with a uniform wall thickness. The embodiment is not limited to one longitudinal groove thereby; it may also have numerous longitudinal grooves in an arbitrary configuration on the exterior circumference.

In the following, the invention shall be explained in greater detail, based on drawings depicting only one means of execution. Other characteristics and advantages substantial to the invention can be derived from the drawings and the descriptions thereof.

They show:

FIG. 1a: shows the prior art

Figure 1:
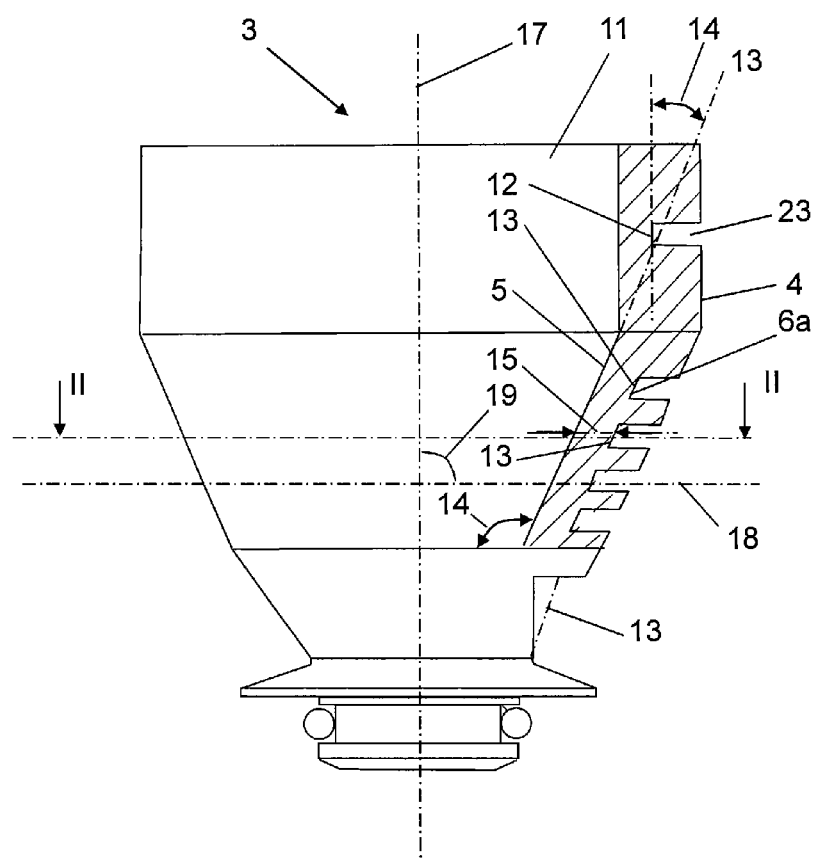
Figure 2:
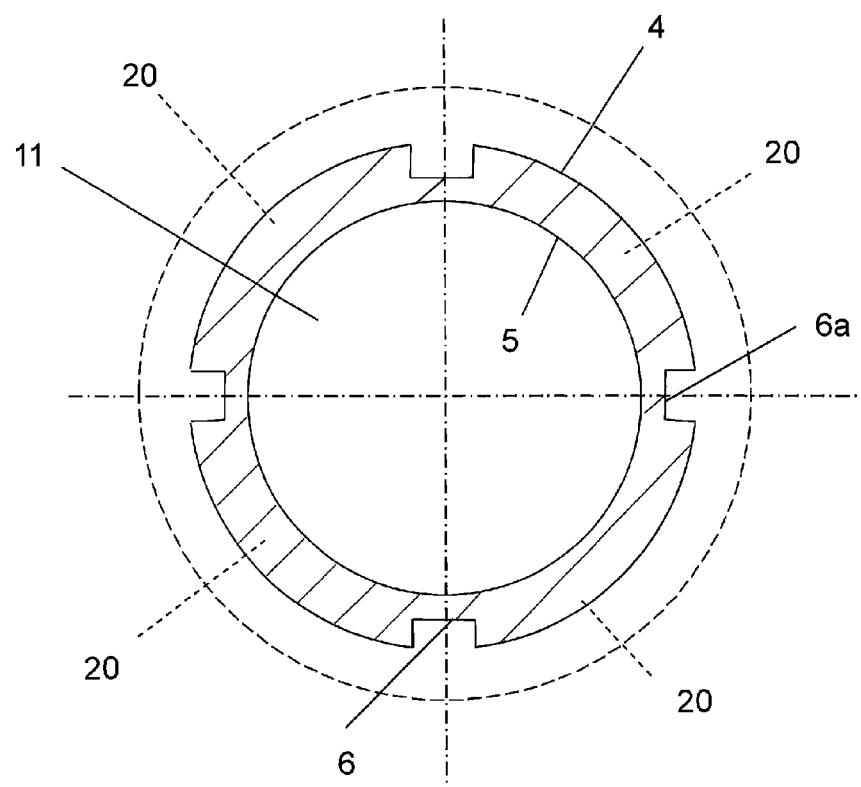
Figure 3:
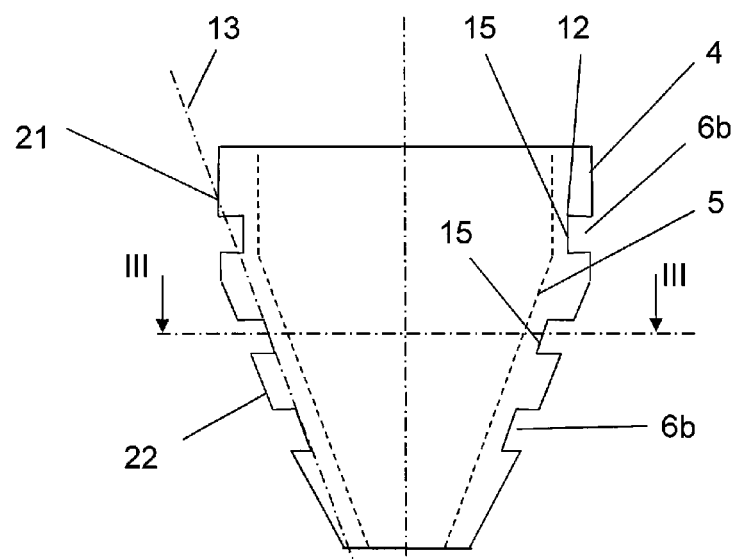
Figure 4:
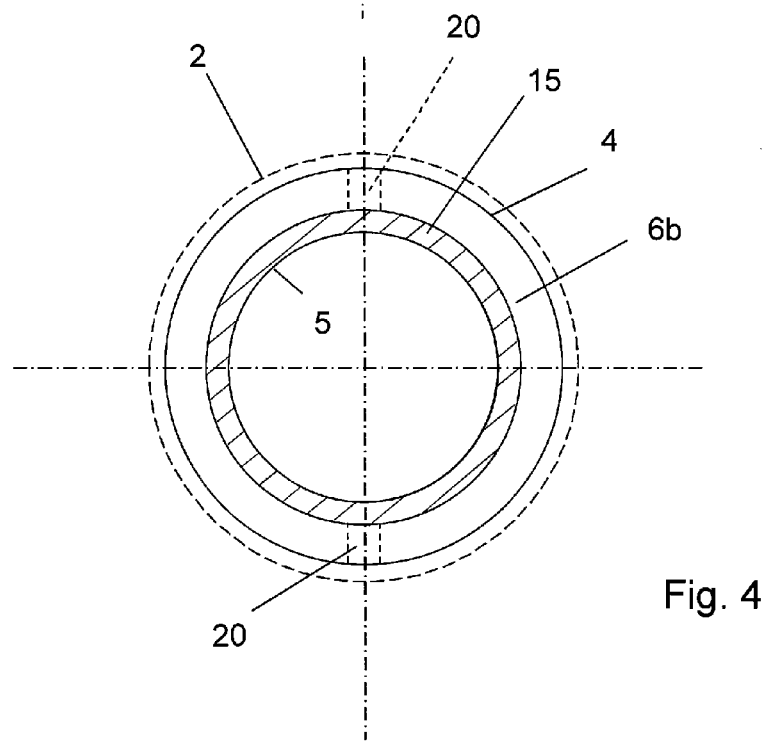
Figure 5:
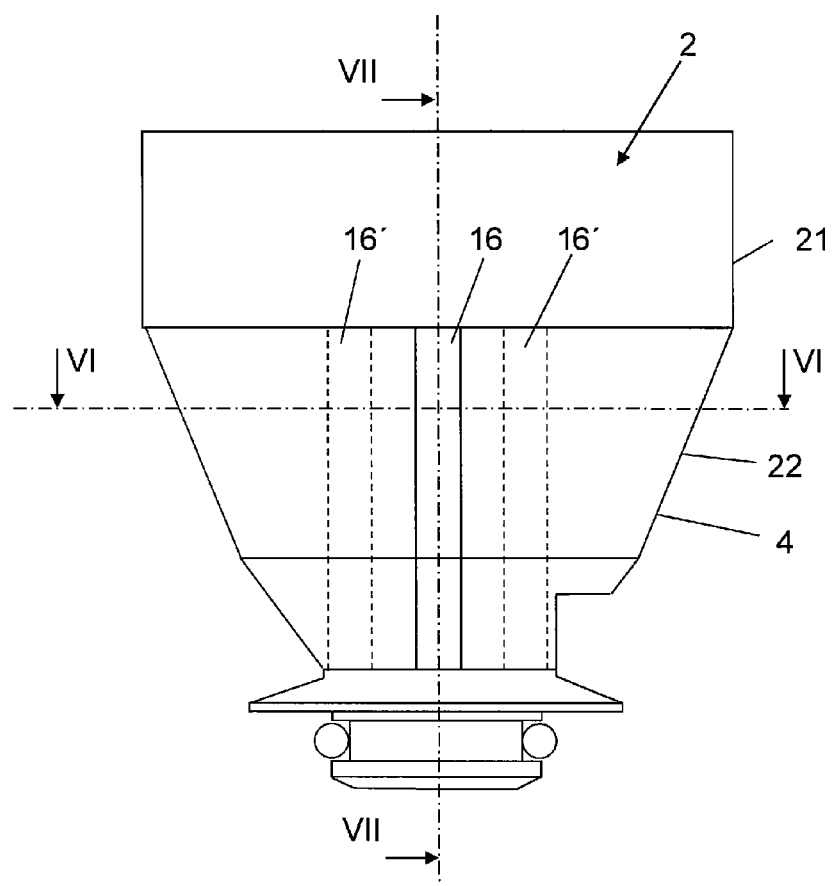
Figure 6:
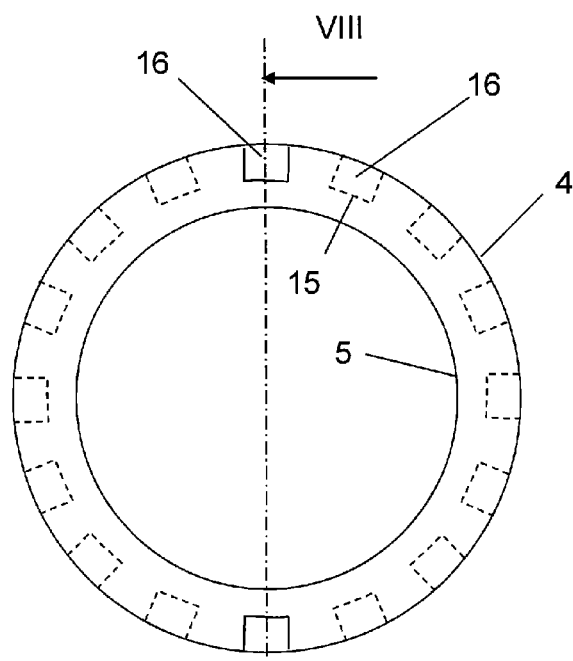
Figure 7:
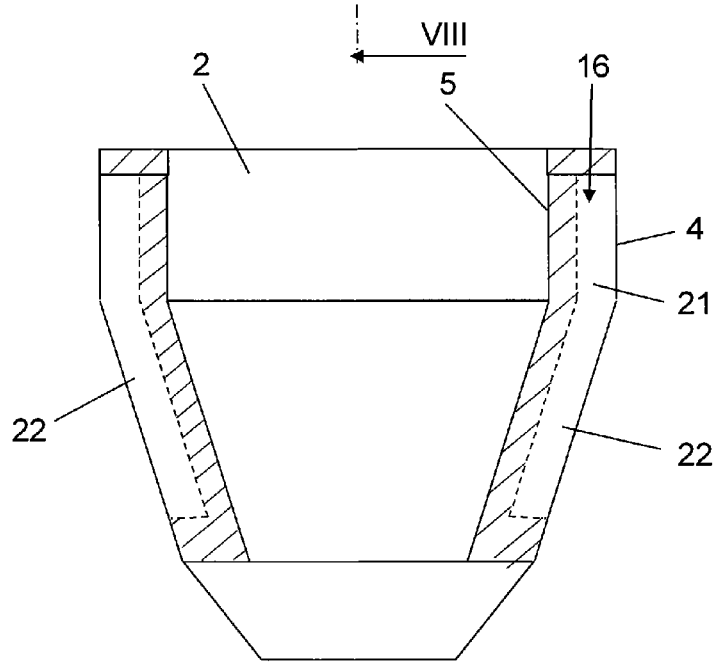

FIG. 1: is a schematic depiction of a nozzle having grooves and a sloped groove base FIG. 2: is a cut through FIG. 1 having a groove and a sloped groove base FIG. 3: is a schematic depiction of a nozzle having annular grooves FIG. 4: is a cut through FIG. 2 having an annular groove and a sloped groove base FIG. 5: is a schematic depiction of a nozzle with longitudinal grooves FIG. 6: is a cut through FIG. 5, with a depiction of the longitudinal grooves FIG. 7: is another cut through FIG. 5, with a depiction of the longitudinal grooves FIG. 1a shows the prior art for plasma cutting torch nozzles. The nozzle device of the plasma torch head 1 consists substantially of a nozzle hood 2 and a nozzle 3. A coolant space 10 is formed between the nozzle hood 2 and the exterior wall 4 of the nozzle 3. A cooling fluid, such as water, for example, flows through the coolant space 10, whereby the liquid is introduced to the coolant space 10 by means of the coolant feed, and removed by means of the coolant return.

The exterior wall 4 of the nozzle 3 has numerous grooves 6a having rectangular profiles, wherein the groove base 12 is straight. The grooves 6a are each directed inward along the longitudinal axis 18 and are at a right angle 19 to the central axis 17 of the nozzle.

The interior wall 5 of the nozzle 3 forms an annular interior space about the central axis 17 of the nozzle for the plasma gas feed 11.

FIG. 1 shows a schematic depiction of a nozzle 3 having numerous, parallel configured grooves 6a. The grooves 6a have a largely rectangular profile, and are located on the exterior wall 4 of the nozzle 3. For this, the embodiment of the groove should not be limited to a rectangle; any other geometric shape is also possible. The grooves 6a are longitudinal incisions in the exterior wall 4, directed inward toward the central axis 17 of the nozzle, wherein the groove base 13 is sloped. The slope of the groove base 13 is the result of the angle 14. The angle 14 is the angle to the central axis 17 of the nozzle. The sloped groove base 13 represents thereby a parallel to the contour of the interior wall 5 of the nozzle 3.

With this embodiment, a uniform wall thickness 15 in the region of the incisions is ensured by the grooves. The grooves 6a are disposed in the conical section of the nozzle 3. Other, additional grooves 23 can be disposed in the cylindrical section of the nozzle 3, outside of the conical section. These too can exhibit a sloped groove base, as is indicated in FIG. 1. Likewise, this groove base may be designed to be straight, and parallel to the likewise vertical inner contour there.

As a result of the sloped groove base 13, the cooling fluid can more effectively accommodate and discharge heat accumulating on the interior wall 5 of the nozzle, because the wall thickness is effectively minimized and there is no danger that with the creation of the grooves by means of a machining of the tool, the minimized wall will be penetrated in the direction of the interior circumference of the nozzle. The sloped groove base therefore provides for a uniform, consistent wall thickness 15 at this cross-section of the wall. This was previously not possible according to the prior art, because the grooves had a straight groove base 12, and therefore resulted in a varying wall thickness. As a result, in the region of the groove base, there was a greater and a lesser wall thickness, impeding the heat transference.

The embodiment example of FIG. 1 shows a plurality of parallel configured grooves 6a in the conical section of the nozzle 3. These are designed either as encompassing or non-encompassing and recessed annular grooves. Moreover, there is a groove 23 located in the cylindrical, straight section of the nozzle, which can exhibit both a sloped groove base 13, as well as a straight groove base 12.

FIG. 2 shows a cut through the section indicated in FIG. 1. In this case, it concerns a depiction of a nozzle having four recessed grooves 6a, which are evenly distributed on the exterior wall 4 of the nozzle 3, and divided by discontinuation sections 20. In addition, the annular interior wall 5 of the nozzle 3 is depicted, which serves as the plasma gas feed 11.

A nozzle is shown in FIG. 3, having a plurality of annular grooves 6b on the exterior wall 4 of the nozzle 3. The annular grooves 6b have a straight groove base 12 in the upper, cylindrical section 21, and in the lower, conical section 22, they have a sloped groove base. The positions of the respective groove bases (12, 13) are based on the contour of the interior wall, and always run parallel thereto. Moreover, it is visible in this depiction that the wall thickness 15 remains constant in all regions of the grooves 6b. This enables an effective heat transfer from the interior wall 5 of the nozzle 3 to the cooling fluid.

FIG. 4 shows a cut through the region indicated in FIG. 3. This shows a top view of the nozzle 3 with the individual wall thicknesses and the encompassing annular groove 6b. The innermost ring forms the interior wall 5 of the nozzle 3, followed by the encompassing annular groove 6b and the exterior wall 4 of the nozzle 3. In addition, the largest circumference of the exterior wall 4 of the nozzle is depicted schematically. The encompassing annular groove 6b can likewise be divided by differently sized discontinuation regions 20.

A nozzle 3 having longitudinal grooves 16 is depicted in FIG. 5. These preferably have a rectangular cross-section and run along the longitudinal axis in the exterior wall 4 of the nozzle 3. The rectangular cross-section is only to be regarded in this case as exemplary; any other geometric shape is also possible for the groove. Likewise, it is possible that the longitudinal grooves 16 only be present in the upper, cylindrical section 21 or in the lower, conical section 22.

FIG. 6 shows a first cut through the FIG. 5. The longitudinal grooves 16 are located in the exterior wall 4 of the nozzle 3. The wall thickness is, however, reduced to the same degree in all regions of the grooves. The interior wall 5 of the nozzle 3 is designed to be annular in shape, and serves to conduct plasma.

FIG. 7 shows another cut through FIG. 5. The longitudinal groove 16 extends thereby along the body of the nozzle, both over the cylindrical section 21 as well as over the conical section 22, and is located in the exterior wall 4 of the nozzle 3.

The invention also claims a configuration, or combination, respectively, in which both annular grooves 6a, 6b as well as longitudinal grooves 16, 22 are disposed.

KEY TO THE DRAWINGS 1. plasma torch head
2. nozzle hood
3. nozzle
4. exterior wall (nozzle)
5. interior wall (nozzle)
6a. groove (incision)
6b. annular groove
7. projection
8. cooling agent feed
9. cooling agent return
10. coolant space
11. plasma gas conductor
12. groove base (straight)
13. groove base (sloped)
14. angle
15. nozzle wall (wall thickness)
16. longitudinal groove
17. central axis of the nozzle
18. longitudinal axis
19. angle
20. discontinuation section
21. region
22. region
23. groove (straight region)

The invention claimed is:

1. A nozzle for a liquid-cooled plasma cutting torch, comprising:
    a plurality of closed, spaced annular grooves disposed on a tapered exterior wall of the nozzle that comes into contact with a liquid, the annular grooves having a longitudinal axis substantially perpendicular to a central axis of the nozzle, wherein the annular grooves reduce a thickness of the exterior wall of the nozzle in at least this region, and each annular groove having a groove base extending into the wall, wherein the groove bases of the annular grooves are substantially parallel to a contour of an interior wall of the nozzle;
    a plurality of discontinuous portions of the exterior wall being spaced apart from each other by at least one of the annular grooves; and
    a plurality of longitudinal grooves extending along a longitudinal length of the exterior wall, each longitudinal groove having a region having a straight groove base and a region having a sloped groove base at an angle to the central axis of the nozzle, at least one of the straight groove base and the sloped groove base of each of the longitudinal grooves being substantially parallel to the contour of the interior wall of the nozzle.

2. The nozzle according to claim 1, wherein the thickness of the wall is reduced to the same degree in the region of the groove base of the annular grooves.

3. The nozzle according to claim 1, wherein each of the annular grooves is a closed, annular groove running along a circumference of the nozzle.

4. The nozzle according to claim 1, wherein each of the annular grooves is positioned on a circumference of the nozzle and is spaced apart from adjacent annular grooves by at least one of the discontinuous portions of the exterior wall.

5. The nozzle according to claim 1, wherein the longitudinal grooves run in the exterior wall of the nozzle.

6. The nozzle according to claim 2, wherein each of the annular grooves is a closed, annular groove running along a circumference of the nozzle.

7. The nozzle according to claim 3, wherein each of the annular grooves is positioned on a circumference of the nozzle and is spaced apart from adjacent annular grooves by at least one of the discontinuous portions of the exterior wall.

8. The nozzle according to claim 2, at least one wherein the longitudinal grooves run in the exterior wall of the nozzle.

9. The nozzle according to claim 3, wherein the longitudinal grooves run in the exterior wall of the nozzle.

10. The nozzle according to claim 4, wherein the longitudinal grooves run in the exterior wall of the nozzle.

11. The nozzle according to claim 2, wherein the other of the sloped groove base and the straight groove base of each longitudinal groove runs substantially parallel to the contour of the interior wall of the nozzle.

12. The nozzle according to claim 3, wherein the other of the sloped groove base and the straight groove base of each longitudinal groove runs substantially parallel to the contour of the interior wall of the nozzle.

13. The nozzle according to claim 4, wherein the other of the sloped groove base and the straight groove base of each longitudinal groove runs substantially parallel to the contour of the interior wall of the nozzle.

14. The nozzle according to claim 5, wherein the other of the sloped groove base and the straight groove base of each longitudinal groove runs substantially parallel to the contour of the interior wall of the nozzle.

15. A nozzle for a liquid-cooled plasma cutting torch, comprising:
    a plurality of spaced annular grooves disposed on an exterior wall of the nozzle that comes into contact with a liquid, each of the annular grooves having a longitudinal axis substantially perpendicular to a central axis of the nozzle, wherein the annular grooves reduce a thickness of the exterior wall of the nozzle in at least this region, and each annular groove having a groove base extending into the wall, wherein the groove bases of the annular grooves are substantially parallel to a contour of an interior wall of the nozzle.

16. The nozzle of claim 15, further comprising a plurality of discontinuous portions of the exterior wall spaced apart from each other by at least one of the annular grooves.

17. The nozzle of claim 15, wherein each of the annular grooves is a closed, annular groove running along a circumference of the nozzle.

18. A nozzle for a liquid-cooled plasma cutting torch, comprising:
    a plurality of longitudinal grooves extending along a longitudinal length of the nozzle, each longitudinal groove having a region with a straight groove base and a region with a sloped groove base at an angle to the central axis of the nozzle, and at least one of the straight groove base and the sloped groove base of each of the longitudinal grooves is substantially parallel to the contour of the interior wall of the nozzle.

19. The nozzle of claim 18, further comprising a plurality of discontinuous portions of the exterior wall spaced apart from each other by at least one of the longitudinal grooves.

20. The nozzle of claim 18, wherein the other of the sloped groove base and the straight groove base of each longitudinal groove runs substantially parallel to the contour of the interior wall of the nozzle.

* * * * *

UNITED STATES PATENT AND TRADEMARK OFFICE
CERTIFICATE OF CORRECTION

| | |
|---|---|
| PATENT NO. | : 9,095,037 B2 |
| APPLICATION NO. | : 13/576481 |
| DATED | : July 28, 2015 |
| INVENTOR(S) | : Manfred Hollberg |

It is certified that error appears in the above-identified patent and that said Letters Patent is hereby corrected as shown below:

In the claims

Claim 8, Column 6, Line 21, delete "at least one"

Signed and Sealed this
Twenty-second Day of December, 2015

Michelle K. Lee
*Director of the United States Patent and Trademark Office*